July 25, 1961 W. J. KINDERMAN 2,993,376
TEMPERATURE COMPENSATION FOR LIQUID LEVEL GAUGE
Filed March 23, 1959

INVENTOR
WALTER J. KINDERMAN
BY
ATTORNEYS ced July 25, 1961

2,993,376
TEMPERATURE COMPENSATION FOR LIQUID LEVEL GAUGE

Walter J. Kinderman, Philadelphia, Pa., assignor to Yarnall-Waring Company, Chestnut Hill, Pa., a corporation of Pennsylvania
Filed Mar. 23, 1959, Ser. No. 801,149
5 Claims. (Cl. 73—290)

The present invention relates to temperature compensation for liquid level gauges.

A purpose of the invention is to compensate for the error in reading of a liquid level gauge due to the variation of the density of the liquid with temperature.

A further purpose is to provide a heater tube extending vertically through a gauge passage open at the top, and connected at the bottom to a boiler or the like at a point substantially below the connection of the gauge passage to the liquid space of the boiler.

A further purpose is to locate the heater tube out of line with the gauge passage and preferably to flatten the heater tube so that it will not obstruct the windows of the gauge.

A further purpose is to maintain the position of the heater tube at one side of the gauge by spacers extending across the gauge passage out of line with the windows.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figures 1, 2, 3:
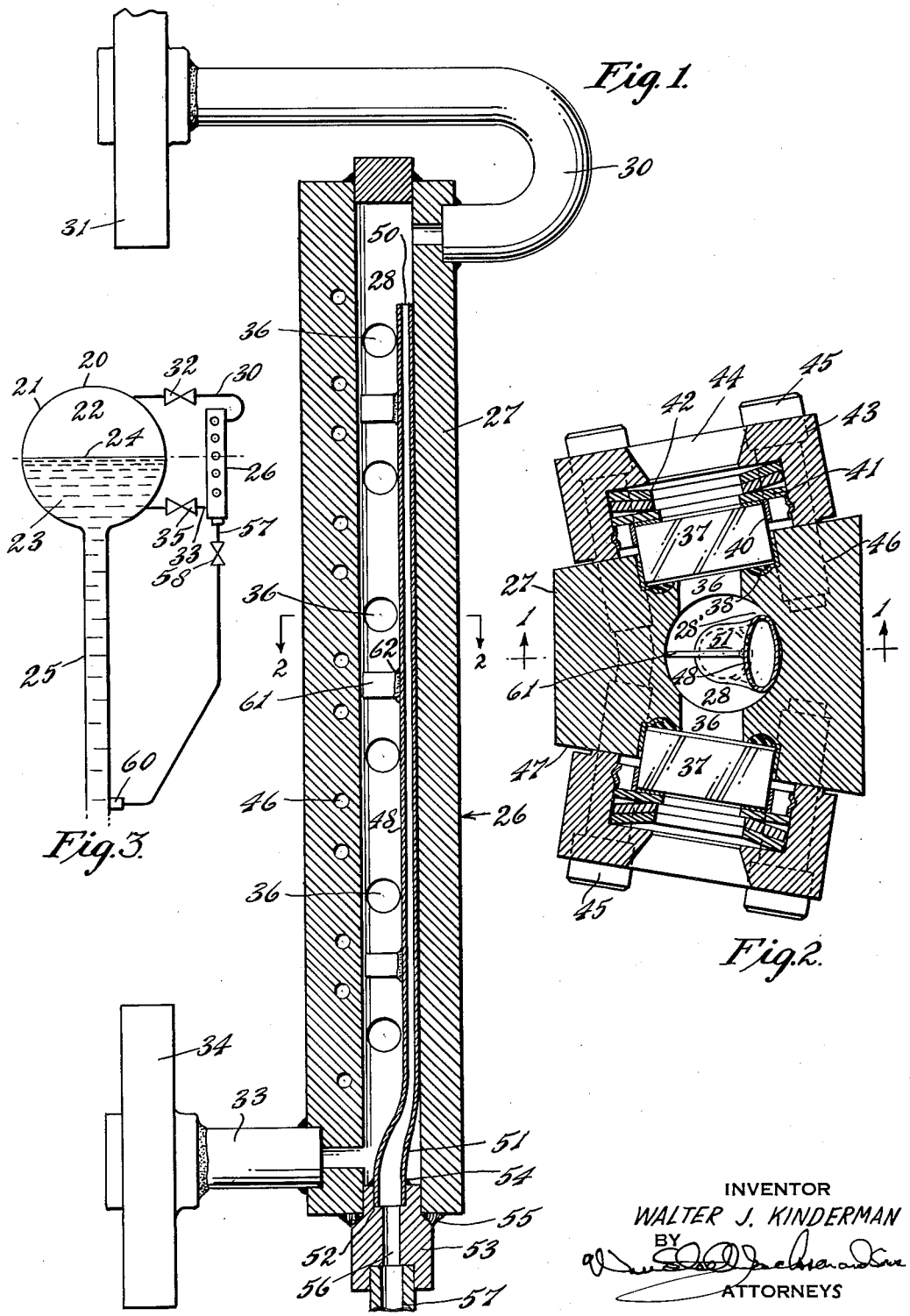
FIGURE 1 is a fragmentary vertical section of the gauge of the invention, the section being taken on the line 1—1 of FIGURE 2.
FIGURE 2 is an enlarged section on the line 2—2 of FIGURE 1.
FIGURE 3 is a diagram shown in vertical section and illustrating the installation of the gauge of the invention.

Describing in illustration but not in limitation and referring to the drawings:

In the discussion of the present invention, the device on which the liquid level gauge is installed will be assumed to be a boiler, although it will be evident that it may be some other suitable device of related character.

Liquid level gauges having windows as customarily used on boilers normally cool to a mean temperature below that of the water and the steam in the boiler. As it cools, the density of the liquid in the gauge increases as compared to the density of the liquid in the boiler, and the liquid level as indicated in the gauge is lower than the true level of the liquid in the boiler. This error becomes more pronounced in the case of high pressure steam boilers, and at very high pressures the error is quite pronounced. In a modern boiler where the operating pressure is of the order of 2000 p.s.i.g. or higher, the error may be a large percentage of the total water level range, and compensation or correction is imperative.

One simple way to make the correction is to maintain the gauge temperature close to the boiler temperature, thus equalizing the densities of the liquid and assuring that the gauge reading will be accurate. One simple approach to the problem has been to insulate the gauge and heat the lower portion of the gauge by means of steam circulating through separate passages in the gauge body. Since the steam maintains a constant temperature and supplies heat losses by latent heat of condensation, this is a very effective method.

Normally the steam passages consist of holes bored in the gauge body, communicating at the top with a steam space and connecting at the bottom to a pipe which returns to the boiler system at a point several feet below the water level. This arrangement permits cooling of the condensate in the pipe below the gauge, and increases the density of the liquid sufficiently to suppress the level of the water to a point below the bottom of the gauge. The result is that the entire gauge structure is heated to steam temperature. Of course the water in the gauge is heated and its liquid level is therefore close to the boiling water level.

Several serious difficulties have been encountered in corrective devices of this sort.

It is very inconvenient to insulate the gauge from the standpoint of gauge maintenance, and unless the gauge is insulated there is constant heat loss from the surface of the gauge. Localized steam heating of a portion of the gauge is only partially effective since the maximum temperature available to heat the gauge is limited to the steam temperature and the constant heat flow lowers the mean temperature to a value below the steam temperature. If the heating passages are substantially removed from the vertical passage through the gauge, the temperature difference between steam temperature and the actual water temperature in the gauge is considerable. Therefore the compensation is not complete.

Where separate steam heating passages are provided in the gauge body, it is necessary to use a large gauge body cross section, which has a considerably larger heat radiation surface. This increases the cost of the gauge and reduces its efficiency.

For the sake of symmetry at least two heating passages are required, and this interposes complications and requires a common connection from the tube passages to the drain tube external to the gauge body.

Since the presence of the heating passages requires that a larger gauge body be subjected to steam pressure, and stresses in the gauge body are increased and the construction of the gauge body for that reason is more expensive.

Surging of water from a return connection external to the gauge at lower temperature back into the gauge as the water level rises may set up stresses by reason of difference in temperature between the portion in contact with water gauge and the gauge portion in contact with steam. Such difference in temperature is detrimental and may initiate fatigue failure.

The present invention provides the advantages of heating passages in the gauge body, without the disadvantages above referred to.

The invention can be applied to any window type liquid level gauge, but for simplicity it has been illustrated as applied to a gauge having several separate sets of windows at different levels. The question of whether the windows are continuous, or whether there are several separate windows, is unimportant in the present invention.

Referring to the drawings, I illustrate a boiler 20 having a steam drum 21 provided with a steam space 22 and a water space 23 and having a liquid level 24, and below the steam drum there is a water leg 25 which is connected at the bottom to a suitable mud drum, not shown. It will of course be understood that the boiler includes other conventional features not illustrated.

A liquid level gauge 26 has a body 27 and a vertical suitably cylindrical gauge passage 28 which communicates at the top with a connection 30 which is flanged at 31 and suitably connected through valve 32 in open position to the steam space of the steam drum, and at the bottom of the gauge passage communicates with a connection 33 flanged at 34 which suitably connects through a valve 35 in open position with the water space of the steam drum.

The details of construction of the gauge may vary widely. I illustrate a series of pairs of opposite windows 36 which are in line with the gauge passage and in which the windows of each pair are in line with one another. The windows are covered by gauge glasses 37, suitably of disc form, which are packed on the inside by gaskets 38 suitably as described in United States patent applications of David Robert Yarnall, Serial No. 566,343, filed February 20, 1956, for Liquid Level Gauge and of Frank W. Miller, et al., Serial No. 665,467, filed June 13, 1957, for Liquid Level Gauge and the Like.

The gauge glasses are desirably engaged by shields 40, as described in the above application. On the outside of each gauge glass there is a protective metallic washer 41 provided with a central gauge opening, and sealing pressure is brought to bear on the washer 41 by two metallic Belleville springs 42 used in parallel, having their inward engaging portions directed toward the washer 41. The outermost of the Belleville springs is engaged at the radial outside by a flanged cover 43 having a window opening 44, extending around and seating on the gauge body, and anchored by bolts 45 threaded in suitable bolt openings 46.

The sides of the gauge body 47 are set at a diverging angle as best seen in FIGURE 2 to accommodate a color discriminating illuminator as shown in U.S. patent application, Serial No. 694,062, filed October 31, 1957, for Differential Diffraction Liquid Level Gauge. This feature, while preferable, is not essential to the present invention.

It will be noted that the gauge passage 28 is wider than the width of the windows, so that there is provided at one side 28' a vertically extending recess which is not in line with the windows.

A metallic heater tube 48 extends vertically through the recess at one side of the gauge passage out of line with the windows. The heater tube has an open end 50 at the top for reception of steam, and at the bottom it suitably has a bent discharge neck 51 which fits into a recess 52 of a bottom plug 53 closing the bottom end of the gauge passage. The heater tube is suitably welded to the plug at 54 and the plug is suitably welded to the gauge body at 55. The plug has an opening 56 which communicates with a pipe or connection 57 which extends through a valve 58 in open position to a connection 60 on the water leg 25 which is at least in the preferred embodiment several feet (say 8 feet) below the liquid level 24. The connection 60 to the water leg is also desirably several feet below the connection 33 to the liquid space of the steam drum.

The heater tube is desirably narrower in cross section at right angles to the axis of the windows than it is in cross section longitudinally of the axis of the windows, and this is accomplished by flattening the heater tube in its vertical portion which runs past the windows. The cross section is preferably oval as shown, although it is unimportant to the present invention whether it be rectangular or oval or otherwise flattened.

To assure that the heater tube maintains a position well out of line with the windows, metallic strip spacers 61 are suitably welded at 62 to the heater tube and they extend across the gauge passage at points where they will not interfere with the windows.

The heater tube and plug assembly can be separately fabricated and then inserted in the bottom of the gauge, and the plug welded to the gauge body to complete the assembly. This makes possible assembly at low cost.

The heater tube can be cut to the desired length, and thus installations can be made in gauges of standard manufacture or special gauges without adding substantially to the cost, and inventory can be maintained at a minimum. The same gauge can if desired be offered with or without the heater tube, simply welding in a plug closure at the bottom when the heater tube is not being used.

In operation, it will be evident that the flattened heater tube will maintain the liquid in the gauge at substantially steam temperature, since steam is contained in the entire heater tube to a condensate level which establishes below the gauge by reason of the cool and higher density water in the return tube 57 as compared to the hot water in the boiler.

The heat transfer takes place to the water in the gauge rather than to the gauge body, and thus it is not necessary to heat the gauge body completely to steam temperature.

A very desirable aspect of the invention is that visibility of the liquid level is increased. The placement of the heater tube at one side of the gauge passage provides for circulation of water in the gauge. Generally flow up is permitted adjacent to the heater tube and generally flow down occurs at the opposite side of the gauge passage in the liquid. This causes slight turbulence of the meniscus of the liquid in the gauge which makes the liquid level more visible in clear gauges and adds a dynamic property which more sharply distinguishes the meniscus in color separation gauges.

The circulation also imparts a dynamic lift which causes the water level in the gauge to approach more closely to the water level in the boiler, and thus makes the compensation more accurate.

The heater tube may be made of a wide variety of materials such as stainless steel, bronze, beryllium copper and the like, but stainless steel is preferable to minimize corrosion.

The device of the invention makes it unnecessary to use the heavy gauge bodies which were formerly employed and makes it unnecessary to bore heater passages.

Only one heater tube is necessary, and therefore the balanced constructions of the prior art using two heater passages are unnecessary.

There is no necessity for supplemental machining to join together two of the heater passages.

Furthermore the heater tube does not introduce thermal stresses and danger of thermal fatigue is eliminated. In case the heater tube should become clogged, the entire heater tube can be replaced by opening the weld 55 at the bottom of the gauge and inserting a new heater tube assembly.

Since there are no right angle bends, the likelihood of accumulation of dirt and scale in the heater tube is minimized. The heater tube is of streamline form which does not provide any appreciable dead space where clogging is likely to occur.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claim.

Having thus described my invention what I claim as new and desire to secure by Letters Patent is:

1. In a liquid level gauge for use with a boiler or the like, a body having a vertically extending gauge passage provided with windows at opposite sides, gauge glasses covering the windows, covers securing the gauge glasses to the body, a top connection from the gauge passage adapted to communicate with the steam space of the boiler, and a bottom connection from the gauge passage adapted to communicate with the water space of the boiler, in combination with a heater tube extending vertically through the gauge passage, open at the upper end to the upper portion of the gauge passage, and a connection from the bottom of the heater tube adapted to communicate with the water space of the boiler at a level substantially below the gauge connection to the water space.

2. A gauge of claim 1, in which the heater tube is located at one side of the gauge passage out of line with the windows.

3. A gauge of claim 1, in which the heater tube is flattened in cross section.

4. A gauge of claim 1, in which the heater tube is located at one side of the gauge passage out of line with the windows and is flattened in cross section.

5. A gauge of claim 1, in which the heater tube is located at one side of the gauge passage in combination with spacers extending across the passage and holding the heater tube in its position.

References Cited in the file of this patent

UNITED STATES PATENTS 2,064,148     Brelsford _____ Dec. 15, 1936

FOREIGN PATENTS 802,950     France _____ June 22, 1936